US012780498B2

(12) United States Patent
Baker et al.

(10) Patent No.: US 12,780,498 B2
(45) **Date of Patent: *Nov. 3, 2026**

(54) SYSTEMS AND METHODS FOR TRACKING REFILLABLE PACKAGES FILLED AT A BOTTLING FACILITY

(71) Applicant: The Coca-Cola Company, Atlanta, GA (US)

(72) Inventors: Matthew William Baker, Marietta, GA (US); Kuil Park, Atlanta, GA (US); Joshua Casey Schwarber, Decatur, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/983,460

(22) Filed: Dec. 17, 2024

(65) Prior Publication Data

US 2025/0115393 A1 Apr. 10, 2025

Related U.S. Application Data

(63) Continuation of application No. 17/759,625, filed as application No. PCT/US2021/026127 on Apr. 7, 2021, now Pat. No. 12,269,646.

(Continued)

(51) Int. Cl.
*B65D 23/14* (2006.01)
*G06K 19/077* (2006.01)

(52) U.S. Cl.
CPC ....... *B65D 23/14* (2013.01); *G06K 19/07773* (2013.01); *B65D 2203/10* (2013.01)

(58) Field of Classification Search
CPC ................ B65D 23/14; B65D 2203/10; G06K 19/07773
See application file for complete search history.

(56) References Cited

U.S. PATENT DOCUMENTS 5,118,009 A * 6/1992 Novitsky ................. B67D 1/06 222/88
6,732,921 B1 5/2004 Heuft et al.

(Continued)

FOREIGN PATENT DOCUMENTS

DE 42 37 577 A1 5/1993
EP 0 255 861 A2 2/1988

(Continued)

OTHER PUBLICATIONS

International Search Report and Written Opinion for PCT/US2021/026127, dated Jul. 7, 2021 (9 pp.).

(Continued)

*Primary Examiner* — Gary C Hoge
(74) *Attorney, Agent, or Firm* — Eversheds Sutherland (US) LLP

(57) ABSTRACT

The present application provides a bottling facility for filling a refillable package. The bottling facility may include a filler for filling the refillable package, a radio frequency identification tag positioned on the refillable package, a radio frequency identification reader, and a data processing system in communication with the radio frequency identification reader. The radio frequency identification reader identifies the radio frequency identification tag when the refillable package is refilled and the data processing system tracks the number of times the refillable package is refilled.

15 Claims, 8 Drawing Sheets

Related U.S. Application Data

(60) Provisional application No. 63/007,083, filed on Apr. 8, 2020.

(56) References Cited

U.S. PATENT DOCUMENTS

| | | | | |
|---|---|---|---|---|
| 9,550,662 | B1 * | 1/2017 | Brown | B67D 7/348 |
| 10,094,048 | B2 | 10/2018 | Chou | |
| 10,452,875 | B2 | 10/2019 | Forster et al. | |
| 2011/0169614 | A1 | 7/2011 | Mingerink et al. | |
| 2014/0053944 | A1 | 2/2014 | Wang | |
| 2014/0216603 | A1 * | 8/2014 | Brown | G07F 13/025 141/94 |
| 2014/0352740 | A1 * | 12/2014 | Hunt, Jr. | C11D 3/32 510/200 |
| 2015/0369754 | A1 * | 12/2015 | Buchwald | B65B 3/04 141/92 |
| 2016/0172742 | A1 * | 6/2016 | Forster | H01Q 1/38 343/878 |
| 2017/0240846 | A1 * | 8/2017 | Hunt, Jr. | C11D 1/528 |
| 2018/0057201 | A1 * | 3/2018 | Levenstein | G06K 19/0723 |
| 2018/0362394 | A1 * | 12/2018 | Sanderson | C03C 17/3417 |
| 2019/0287089 | A1 * | 9/2019 | Mahncke | G07F 9/001 |
| 2020/0160137 | A1 * | 5/2020 | Melo | G06K 19/07718 |
| 2021/0039937 | A1 * | 2/2021 | Tansey, Jr. | B67C 3/10 |
| 2022/0024747 | A1 * | 1/2022 | Clüsserath | B67C 3/005 |
| 2022/0028206 | A1 * | 1/2022 | Crawford | G07F 7/06 |
| 2022/0212911 | A1 * | 7/2022 | Hayakawa | B65B 55/10 |
| 2022/0259027 | A1 * | 8/2022 | Mullenaux | B67C 3/2631 |
| 2022/0318588 | A1 * | 10/2022 | Shimada | G06K 19/07775 |
| 2023/0014467 | A1 * | 1/2023 | Park | G01N 1/14 |

FOREIGN PATENT DOCUMENTS

| | | | | |
|---|---|---|---|---|
| EP | 0 694 870 | A1 | 1/1996 | |
| EP | 3 410 367 | A1 | 12/2018 | |
| JP | 2017173166 | A | 9/2017 | |
| KR | 20120031752 | A | 4/2012 | |
| KR | 101206204 | B1 * | 11/2012 | G06K 19/0717 |
| KR | 20130017769 | A | 2/2013 | |
| WO | 00/45309 | A2 | 8/2000 | |
| WO | 2010/059373 | A2 | 5/2010 | |
| WO | 2015/147995 | A1 | 10/2015 | |
| WO | 2018073568 | A1 | 4/2018 | |
| WO | 2018/206543 | A1 | 11/2018 | |
| WO | 2019/238791 | A1 | 12/2019 | |
| WO | 2019/246342 | A1 | 12/2019 | |

OTHER PUBLICATIONS

Extended European Search Report for EP 21785397.7, dated Mar. 20, 2024 (8 pp.).

* cited by examiner

SYSTEMS AND METHODS FOR TRACKING REFILLABLE PACKAGES FILLED AT A BOTTLING FACILITY

RELATED APPLICATION

The present application is a continuation of U.S. application Ser. No. 17/759,625, filed on Jul. 28, 2022, now allowed, which is a nation phase application of International Application No. PCT/US2021/026127, filed on Apr. 7, 2021, which claims priority for U.S. Provisional Application No. 63/007,083, filed on Apr. 8, 2020.

TECHNICAL FIELD

The present application and the resultant patent relate generally to refillable packages such as plastic bottles and the like and more particularly relate to systems and methods for tracking such refillable packages to determine package lifetime, usage, location, and other parameters.

BACKGROUND OF THE INVENTION

Polyethylene terephthalate (PET) containers have been used for packaging beverages such as carbonated soft drinks (CSD) for many years. Refillable CSD bottles represent a growing aspect of renewable and sustainable packaging applications. Refillable CSD bottles often may be reused about twenty or more times or refilling cycles before the bottle has to be removed from circulation and routed to a recycling processor. Bottles may be retired for a variety of reasons including visual appearance, chemical detection techniques, performance loss, and the like. Bottle quality reject data indicates that surface abrasion, scuffing, and stress cracking at the base, the shoulder, or the finish may account for most of the rejected bottles. Surface abrasion and scuffing damage may accumulate in each return cycle until the bottle becomes hazy. Cracking may result from the high temperature caustic (aqueous base) washing process used for sterilization as well as other types of environmental agents. Determining the how and why a particular bottle is damaged thus may increase overall bottle lifetime in an environmentally friendly fashion.

The life of a bottle may be measured in different ways but a key metric is the number of times the bottle is returned and refilled before the bottle is lost or damaged. This metric is interchangeably referred to as lifetime, trips, cycles, refills, turns, and the like. Tracking this information, however, has been difficult with traditional date codes or other types of two dimensional codes. Non-unique or "batch" codes generally are not useful in tracking the life of refillable bottles. Moreover, two dimensional codes are susceptible to wear and abrasion from the caustic wash, line interactions, transportation, consumer abuse, and other types of unforeseen interactions. Bottles nearing the end of their lifetime may have significant abrasions so as to limit the functionality of the code at the point when the data may be most critical.

SUMMARY OF THE INVENTION

The present application and the resultant patent provide a bottling facility for filling a refillable package. The bottling facility may include a filler for filling the refillable package, a radio frequency identification tag positioned on the refillable package, a radio frequency identification reader, and a data processing system in communication with the radio frequency identification reader. The radio frequency identification reader identifies the radio frequency identification tag when the refillable package is refilled and the data processing system tracks the number of times the refillable package is refilled The present application and the resultant patent further provide a method of tracking refillable package lifetime. The method may include the steps of placing a radio frequency identification tag on the refillable package, filling the refillable package at a bottling facility, distributing the filled refillable package to a customer, receiving the refillable package at the bottling facility, reading the radio frequency identification tag on the refillable package, and tracking the number of times the radio frequency identification tag has been read.

These and other features and improvements of the present application and the resultant patent will become apparent to one of ordinary skill in the art upon review of the following detailed description when taken in conjunction with the shown drawings and the appended claims.

DETAILED DESCRIPTION

Figure 1:
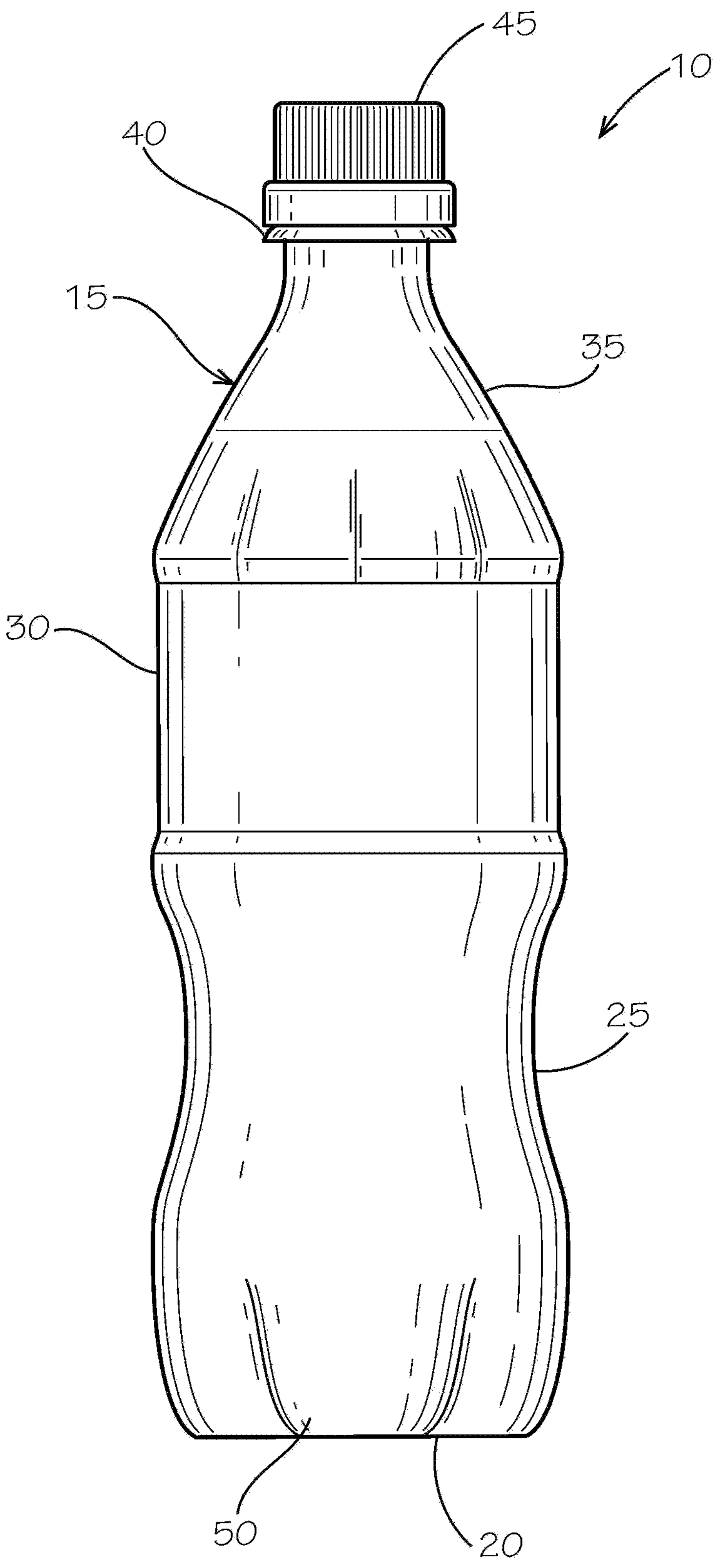
FIG. 1 is a plan view of refillable package as may be described herein.

Referring now to the drawings, in which like numerals refer to like elements throughout the several views, FIG. 1 shows a refillable package 10 as may be described herein. In this example, the refillable package 10 may be in the form of a bottle 15. Although the bottle 15 is described herein, the refillable package 10 may have any convenient size, shape, or configuration and may include, by way of example only, bottles, cans, pouches, or any type of container.

Generally described, the bottle 15 includes a base 20, a waist 25, a label panel 30, a neck 35, mouth 40, and a closure 45. The base 20 of the bottle 15 may have an inwardly rounded "champagne" shape or the bottle 14 may have a number of petaloid feet 50 or other types of support structures formed therein such that the bottle 15 as a whole can stand upright. Alternatively, the base 20 may be outwardly rounded and a separate base cup may be used. The waist 25 and the neck 35 may be curved in shape while the label panel 30 may be a relatively flat surface for the application of a label or other type of covering.

The bottle 15 may be made out of PET (polyethylene terephthalate). Further, similar types of thermoplastics such as HDPE (high density polyethylene), PLA (polylactide acid), PP (polypropylene), or other types of materials may be used herein. The bottle 15 may be manufactured by blow molding (which may include injection stretch blow molding (one or two steps or otherwise) and extrusion blow molding), or similar types of forming techniques. The thermoplastic material may be substantially clear or translucent. By substantially clear or translucent, we mean that the consumer can view the contents of the bottle 15. Colored, clear, or other translucent materials also may be used herein. The closure 45 may be made out of different types of thermoplastics and the like. Other types of materials may include glass, stainless steel, aluminum, and the like.

Figure 2:
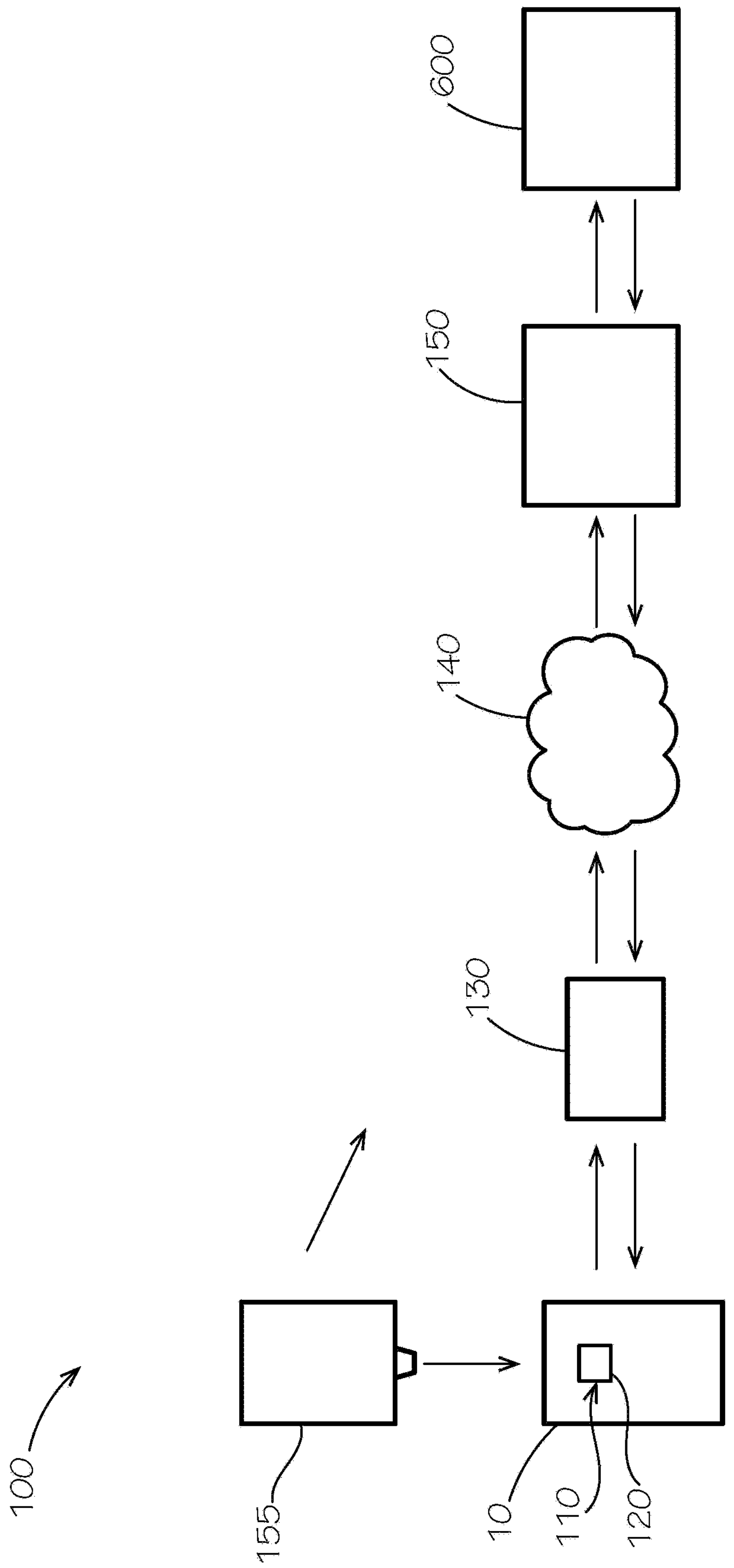
FIG. 2 is a schematic diagram of a refillable package tracking system as may be described herein.

FIG. 2 is a schematic diagram of an example of a refillable package tracking system 100 as may be described herein. The refillable package tracking system 100 may be used with any number or types of bottles 15 or other types or the refillable packages 10. Each bottle 15 or other type of refillable package 10 may have machine readable indicia 110 positioned thereon. The machine readable indicia 110 may be in the form of a radio frequency identification ("RFID") tag 120 and the like. Generally described, the RFID tag 120 includes a micro-chip and an antenna. The RFID tags 120 may communicate with an RFID reader 130. Specifically, the RFID tag 120 may be a proximity card while the RFID reader 130 may be a proximity card coupling device. Such proximity cards may be a MIFARE e-card offered by NXP Semiconductors of Eindhoven, Netherlands. Similar cards may be offered by Paytec Spa of Como, Italy and the like. Similar devices may be used herein. The RFID tag 120 may be contact or non-contact based. The RFID reader 130 may read and write information to and from the RFID tag 120.

The RFID reader 130 may be in communication with a network 140 and one or more data processing systems 150 and the like. The refillable package tracking system 100 likewise may use one or more visual inspection devices 155 to inspect the condition of the bottle 15. The visual inspection devices 155 may include any type of camera and the like to visually inspect the bottle. Overall operation of the refillable packaging system 100 and the other functionality described herein may be controlled by a computer 600 as will be described in more detail below.

The RFID tag 120 may communicate over a variety of wave lengths including HF, UHF, LF, microwave, and the like. The RFID tag 120 itself may utilize any technology standard such as Bluetooth, IrDA, Home RF (SWAP), IEEE 802.11, etc. The RFID tag 120 may be a NFC (Near Field Communication) tag. The RFID tag 120 is generally round or square in shape but may have any convenient shape or size. The tag backing material may include PET or other polymers and elastomers, metal, paper, and the like while the facing materials may include PET or other polymers and elastomers. The tags solutions may be clear or printed. The backing material may be printed with materials, colors, and patterns that do not interfere with the visual inspection equipment. The inner surface may enhance the ease of detection/interrogation, i.e., foam spacing, ferrous boundaries, and the like.

The antenna materials may include metals and silicones. Polymers may be used for cost, added resistant to the refillable environment, printing for circuits and improved recycling, separation, extraction, or sustainability. Beam forming may be used for enhanced communication speed and integrity. The antennas may be custom shaped. For example, the antennas may be shaped like a Coca-Cola bottle or other types of marketing logos. Specifically, shaped antennas and tags that wrap around compound curves such as on the bottle shoulder or a ring that fits over the neck finish and sits on the support ring. Other combinations of shape and size may be used such that the tag forms an annular antenna inside the push up of the base 20. The tags also may be long and thin to accommodate curves or stretching. The antenna may be coiled, folded, or shaped such that it can stretch during blow molding. Such a configuration would have the added advantage of stretching or flexing as the bottle shrinks and flexes during washing. The RFID tag 120 may integrate with other technologies such as energy stores like printed capacitor, solid state batteries, and printed batteries as well as energy harvesting technologies such as Wi-Fi harvesting, Bluetooth harvesting, solid or printed solar/photovoltaic, and piezo-electric and thermo-electric energy harvesting, static electricity, and nanogenerators. GPS receivers may be used for location tracking.

Figure 3:
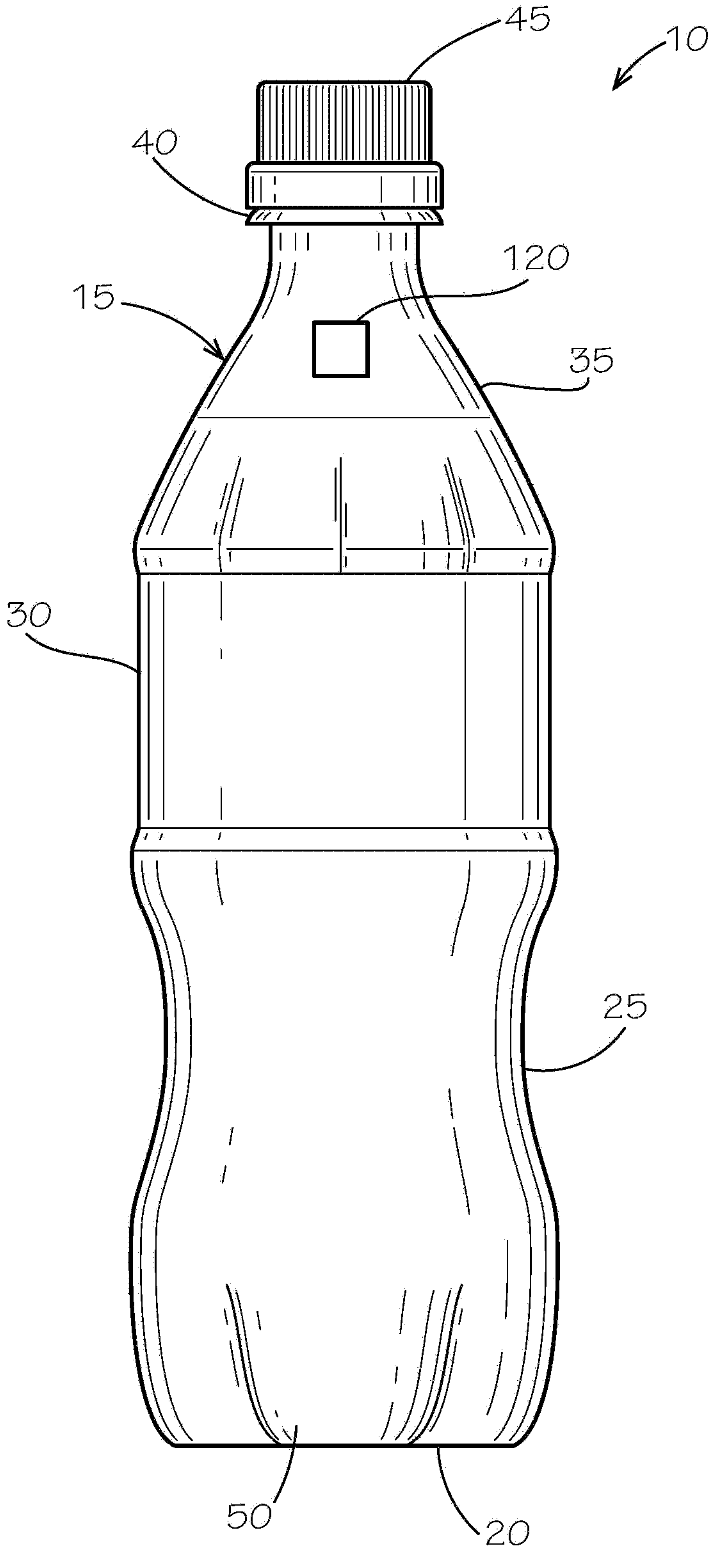
FIG. 3 is a plan view of a refillable package with an RFID tag positioned thereon.
Figure 4:
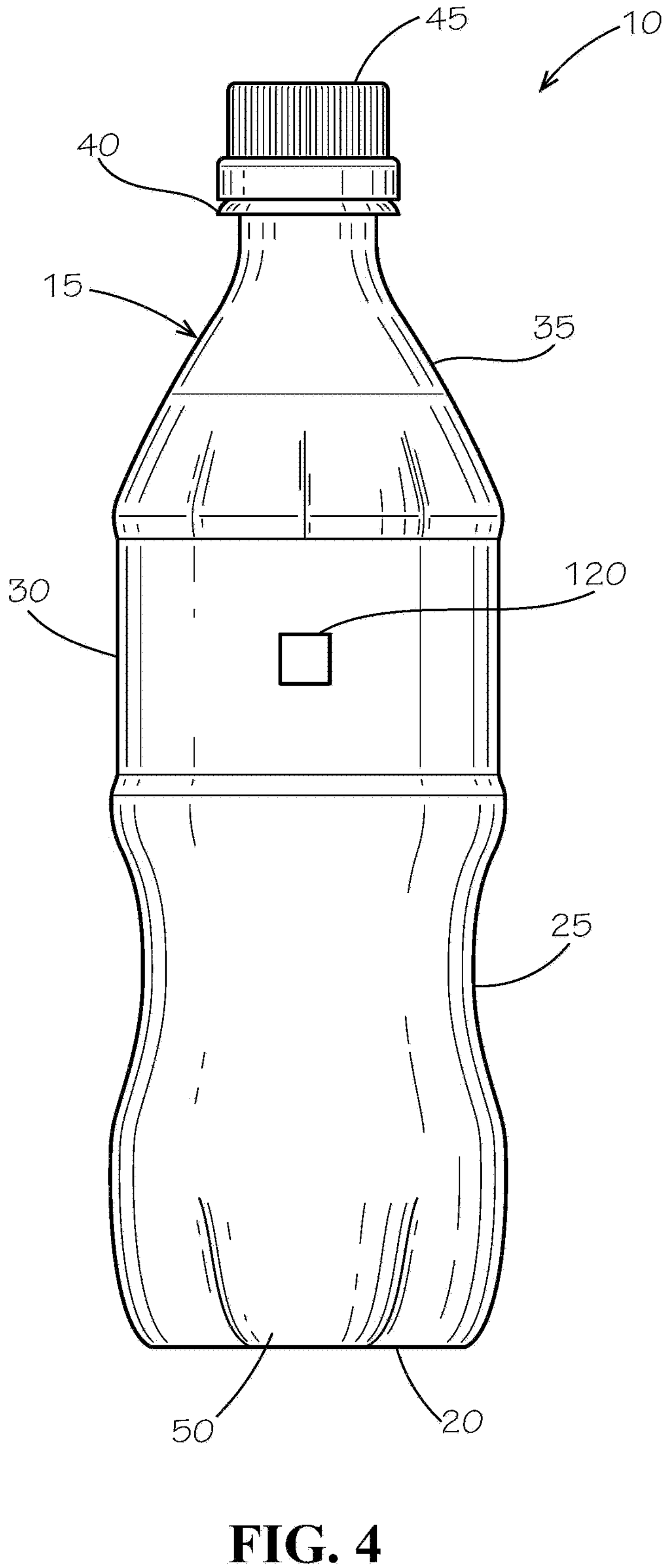
FIG. 4 is a plan view of a refillable package with an RFID tag positioned thereon.
Figure 5:
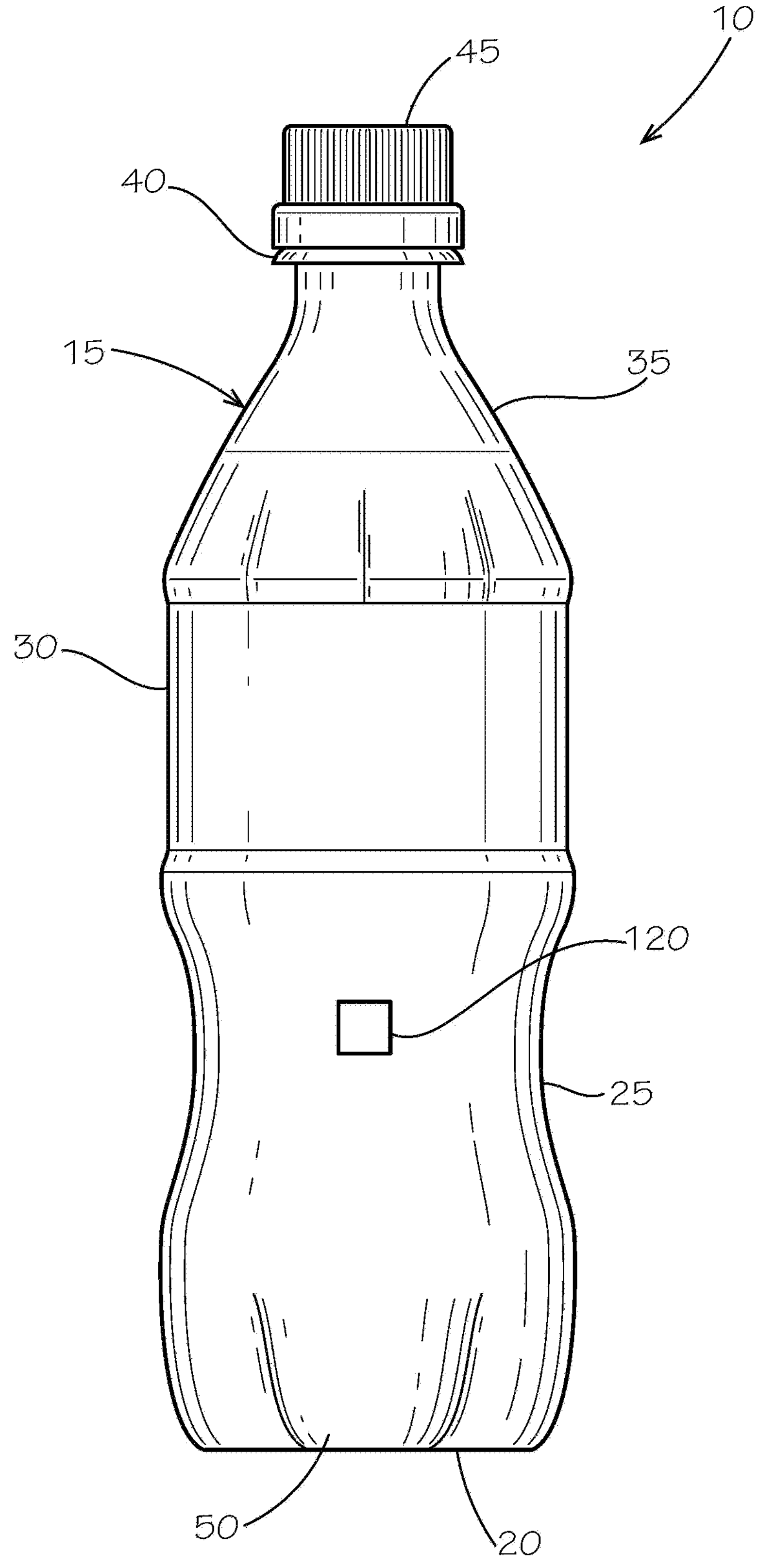
FIG. 5 is a plan view of a refillable package with an RFID tag positioned thereon.
Figure 6:
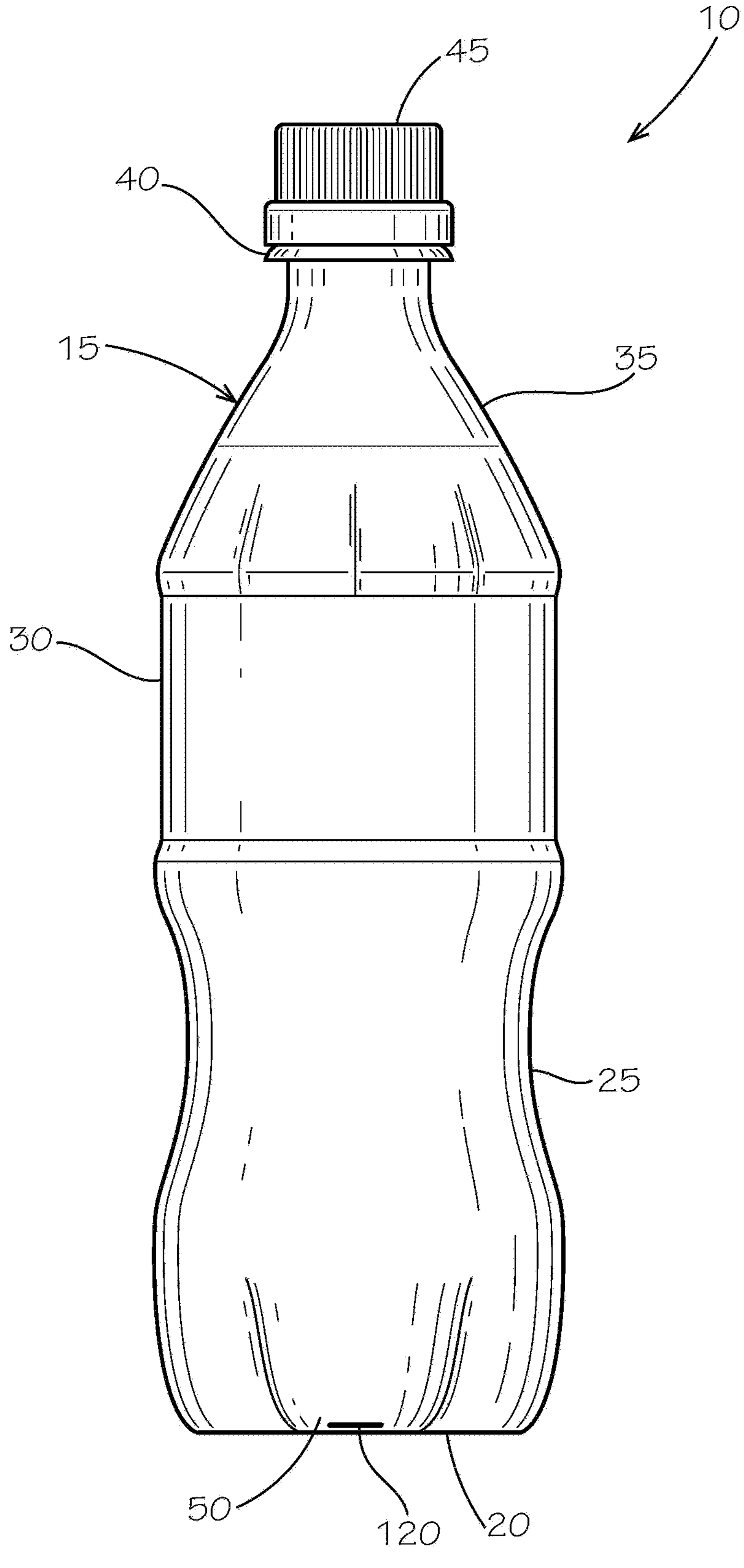
FIG. 6 is a plan view of a refillable package with an RFID tag positioned thereon.

The placement of the RFID tag 120 or other types of machine readable indicia 100 on the bottle 15 or other type of refillable package may vary. FIG. 3 shows the placement of the RFID tag 120 about the neck 35 of the bottle 15. FIG. 4 shows the placement of the RFID tag 120 about the label panel 30 of the bottle 15. FIG. 5 shows the placement of the RFID tag 120 about the waist 25 of the bottle 15. FIG. 6 shows the placement of the RFID tag 120 about the base 20 of the bottle 15. The bottle 15 may be customized to better accommodate and protect the RFID tag 120. For example, the bottle 15 may include pockets, recesses, flattened areas, and the like to protect the RFID tag chip, antenna, or both.

In the most basic iteration, the RFID tag 120 may be applied to any outside surface of the bottle 15 with the caveat that high damage areas such as bump rings, the support ring, the standing ring, and similar locations should be avoided. These areas are not off limits but many tag application methods may be compromised by the uneven surface, i.e., compound curves. The RFID tags 120 should be able to be applied on sharp radiuses, concave or convex, as low as 30 mm but typically in the 60-200 mm range.

The neck 35 provides for easy access and consumer engagement, but such a location is a compound curve, susceptible to wear during washing, may be subject to engagement by a star wheel or other types of bottling equipment, and may block the vision of the bottle inspection cameras. Similarly, the RFID tag 120 also may be placed on a neck support ring. The label panel 30 is often a single radius and thus provides easy attachment. Moreover, the label panel 30 may be recessed from the bump rings. The RFID tag 120 also may be placed behind the label for protection. Unlike visual 2D codes, RFID tags may be read through the label. Utilization in this area may require additional orientation and integration with label graphics. The waist 25 has advantages for consumer access and is also the lowest wash flow area of the sidewall. The base 20 may be advantageous in that the area is highly protected from scuffing and environmental conditions as well as a low flow area in the washer. The loading arm for the washer, however, may contact the base 20. Moreover, the base 20 also may be susceptible to stress cracking. Placement of the tag inside the bottle 15 also may be used.

The RFID tags 120 may be attached to the bottle 15 in a number of ways. For example, the RFID tag 120 may be attached via a pre-applied adhesive, a hotmelt glue that is resist to the high wash temperatures, a cold glue that is resistant to the caustic wash, UV cured adhesives, double labels where a second protective label is placed over the tag, pre-applied cold seals, heat sealing with direct heat, ultrasonic welding, (induction may damage the tag) (heat sealing is ideal for tags placed on the inside of the bottle), friction welding such as spin welding, injection molding into the preform, in-mold labeling with stretch blow molding, single stage injection stretch blow molding with tags integrated during or between, heat transfer where tags are permanent affixed using heat transfer technologies based on resins and waxes, and/or rigid tags that snap into bottle features, such as holes, ridges, and clefs. The RFID tag 120 also may have holes through which an additional mounting technology may be used such as rivets or fasteners of similar or alternative materials. The RFID tag 120 also may be integrated into permanent labels and in particular shrink sleeves that wrap the entire body of the bottle 15. Other types of attachment means may be used herein.

The RFID tags 120 may cooperate with other technologies to determine bottle quality. Potentiometers, Wheatstone bridges, strain gauges of volume change, $CO_2$, shelf life, and shrinkage have applications in consumer quality and in plant performance. For example, strain shows good $CO_2$ retention. These also may measure shrinkage and report old bottles that may be below capacity or too short to fill easily. Such a device also may detect shock. Light/irradiance, chemical or resistance based thermometers, and humidity measurements may be used to protect the product or warn customers of package abuse or poor handling and storage. Exposure limits may help reject packages before loss due to stress crack or other damages. Liquid level detection may be used via a Wheatstone bridge or a similar device. Printed circuits for contamination and chemical detection for preventing fraud, damage, misappropriation, and ensuring environmental and consumer safety. This may be useful on PET packs where chemicals may be absorbed and later migrate into the pack. Tamper evidence where the tags may integrate with tamper evident caps, labels, or other means that are frangible. Time keeping printed circuits may be used to for highly accurate data acquisition such as shock, time stamping exposure, or other events as detected by the technologies listed above. Microbiology detection may be used for quality assurance and safety.

Multiple RFID tags 120 may be used together. Multiple tags may use different technologies such as a combination of UH and HF. There are advantages in read range, read speed, batch read, reader power levels, etc. Multiple chips or tags for communicating with different stake holders (consumer, customer, and recycler) and therefore may communicate different information to each. Multiple tags may be tethered either physical, or electronically where one tag is permanently on the bottle and another tag is integrated into caps/closures, labels, bundle packs, handles, crates, POP displays, shelves, trucks, etc.

Figure 7:
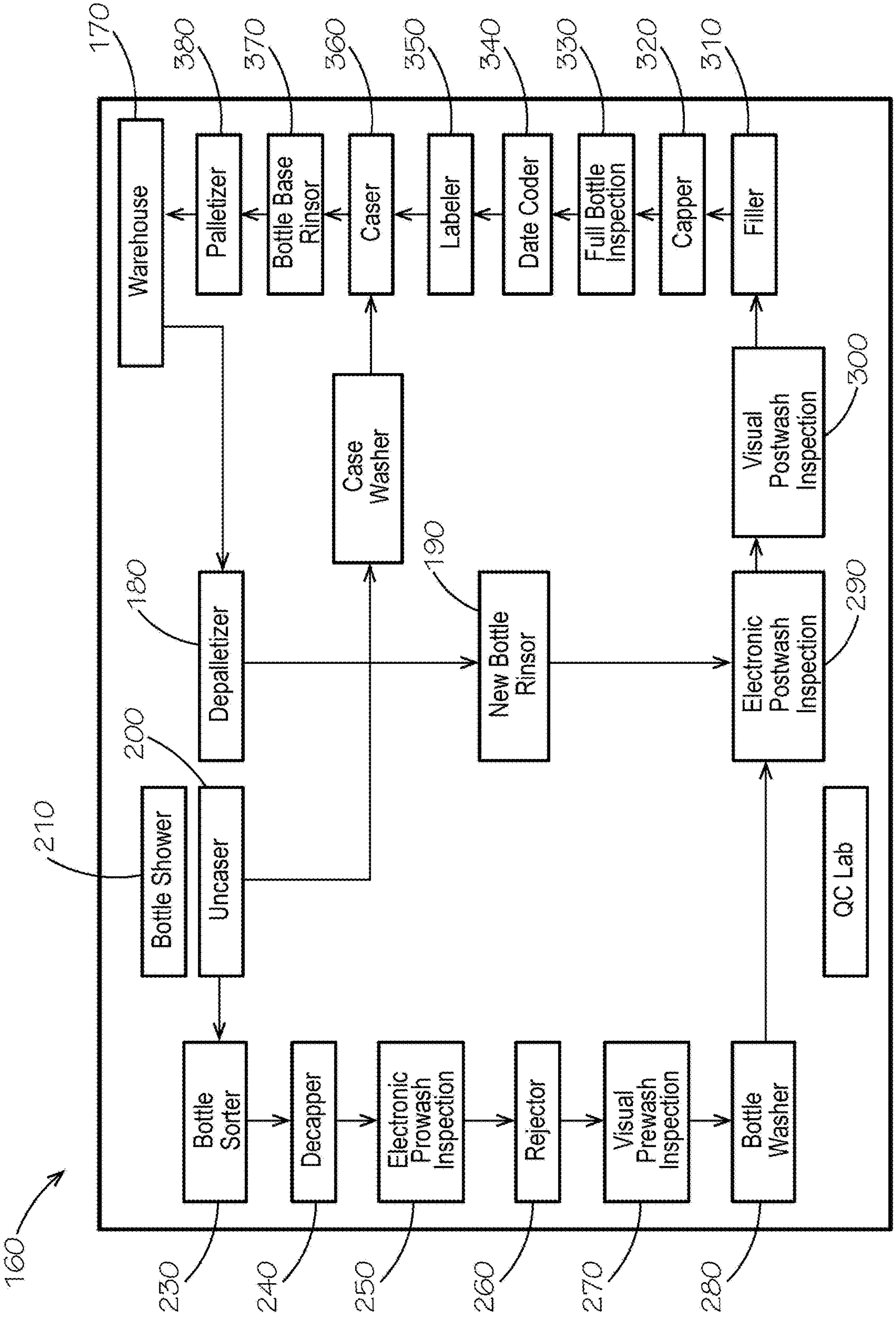
FIG. 7 is a flow diagram of an exemplary bottling facility for use with the refillable package tracking system of FIG. 2.

FIG. 7 shows a flow diagram for a typical returnable bottling facility or plant 160. The bottles 15 may be shipped to the bottling plant 160 from a warehouse 170 or elsewhere. The bottles 15 may be unloaded at a depalletizer 180 with the new bottles 15 going directly to a new bottle rinser 190 and the used bottles 15 being washed and inspected. Specifically, the used bottles 15 may be sent through an uncaser 200, a bottle shower 210, a bottle sorter 230, a decapper 240, an electronic prewash inspection 250, a rejecter 260, a visual prewash inspection 270, and a bottle washer 280. The new bottles and the washed bottles then may be sent through an electronic postwash inspection 290 and a visual postwash inspection 300. The bottles 15 then may be filled in a conventional fashion with a filler 310, a capper 320, a full bottle inspection 330, a date coder 340, a labeler 350, a caser 360, a base rinser 370, and a palletizer 380. The bottling plant 160 described herein is for purpose of example only. Many different stations and functions may be used.

The RFID reader 130 may be placed at many different locations in the bottling plant 160 and elsewhere during the bottle lifecycle. The RFID reader 130 may be at the plant gates for batch reading on inbound pallets. The RFID reader 130 may be integrated into any existing equipment, ASEBI, sniffer, sorter, washing, squeezer/taptone, filler, labeler, sorting, palletizing, and the like. Integration at every stage in the plant provides overall transparency. The bottles 15 generally are sufficiently spaced in these detection units such that overlap should not be an issue. In early iterations, the inspection equipment may reject the bottles 15 and the quality assurance team or line operator may use a gate, iPad, phone, app, or custom reading device to record the rejection and the bottle number. Further iterations may include a reading device at the rejection station of each piece of equipment. Data may be recorded at the station or uploaded to the data processing system 150 and/or the cloud 140. Mature systems may have the readers integrated by the OEM. Full integration allows new capabilities such as a retaining photos of the bottle 15 by the visual inspection system 155 after every turn to "watch" stress cracking and scuffing develop instead of simply pass/fail. Moreover, the readers may be integrated into balers, grinders, and crushers to ensure destruction. Likewise, the readers may be integrated into sorting operations, trucks, store shelves, forklifts, and pallet jacks for the purposes of semi and automated logistics and warehouse management.

Specifically, the bottling plant 160 may use the RFID data in any number of different ways. For example, inbound product tracking, inventory management, FIFO, shipping, and receiving. A major issue may be sorting as this is a major cost driver. RFID will allow sorting without direct line of sight. Therefore, a crate may be checked for correctness much faster and without overhead cameras and machine vision in a more cost effective and more accurate manner. Sorted bottles 15 may be inventoried and staged for production in a faster manner. Sorted bottles 15 may be allocated to different products based on previous fills which is a challenge for universal bottles and may reduce quality complaints.

Bottles 15 with additional damage may be sorted to regions where sales are less affected by appearance or other factors. New bottles 15 that do not met specification may be accurately counted and reimbursed. The bottling plant 160 may track total bottle trips, average life, distribution of life/turns, time in the field, flavors, complaints, damage, and the like. Inspection at each stage will allow for R&D to track each SKU, design variables, or other factors throughout the bottle lifetime. Currently, if a design change is made it is nearly impossible to assess the effectiveness of the change. The bottling plant also may add or write data such as born on, flavor information, $CO_2$ information, and the like to the bottle for quicker communication with the consumer without cellular or Wi-Fi data to access some or all of the key data about the bottle. The bottling plant 160 also may choose to assign promotions, games, raffles, codes, or other marketing information. Information on recycling as well as the overall carbon footprint may be used. Implementation of oleds and screens may allow for a permanent label that changes color and brand according to what is in the bottle 15.

The bottling plant 160 also may track key performance metrics such as stress cracking. Currently, stress cracks may be detected visually and rejected if deemed too severe. When the cracks are too severe, the bottle 15 may burst and the product may be lost. The impact of such loss is extended to other bottles, labels, clean-up, etc. An RFID reader 130 at every station in communication with the data processing system 150 would be able to visually monitor the development of cracks, cross check this information with the equipment that checks for $CO_2$ loss, and count any bursts found in the warehouse. This data may be cross checked against a variety of variables such as the lot code, the production code, bottle processing variables such as time, trips, locations, temperature, humidity, line lube, production variables, line operators, time in field, and the like. The plant thus may gain empirical data and test new variables over time. For example, a new line lube that reduces stress cracking is very hard to monitor as the fleet is in the field with new and old bottles that have been subjected to various factors. A plant also may learn that stress cracking increase in a particular region and may choose to inspect the region via targeted messaging or purposely send older bottles to higher risk areas. Lastly, through big data/machine learning, the photos of developing stress cracks may be feed to an algorithm that may better detect failures and this data may be used for new bottle designs or other R&D. The algorithm may help monitor known variable and recommend changes such as reducing production on a high humidity day where the risk of burst is higher or recommend using or turning off warmers and plant dehumidifiers based on seasonal changes or weather patterns (so as to reduce the overall carbon footprint of the plant).

If the bottles 15 are integrated with other technologies that can detect pressure and fill levels, then the equipment itself may change. Traditional fill height mechanisms may be replaced with self-assessing bottles that tell the machine when to stop filling or the bottle may report hot spots in the washer that are damaging the resin. A self-reporting bottle also may be able to let the warehouse know that it has suffered a crack and that it should be removed. Currently the only indication is visual or the appearance of puddles but to find the bottle inside a pallet is very difficult. Meanwhile the dripping product is making other bottles sticky and thus making them unsellable. The savings for such a system may be significant. The bottling plant 160 also may write information to the bottle such as flavors and cross check this information to make sure the bottle has the correct label.

The data may be individual to the bottle 15 or connected with a crate and pallet. Currently, automated warehouses waste material and capex to wrap pallets and place a label thereon. The RFID tag 120 may eliminate this waste of plastic wrap. Crates also may be custom sorted for more efficient delivery. A stack may include a mix of flavors destined for one store so as to limit picking costs and speeding delivery at the store.

The use of the RFID tags 120 also may improve overall safety. The bottling plant 160 may ensure that rejected bottles 15 cannot be returned to the line. The bottles may be monitored as they enter the grinder to ensure destruction. The tags also may be used for product recalls such that stores, consumers, regulators, and the like can actively remove bottle with 100% accuracy of bad lots versus good lots. Applications with chemical detection may be used to prevent adulterations as well as to alert users of external chemicals such as those that may appear in conflict zones. Consumers may ask that the bottle they used is refilled and sent back to them. RFID in production and warehousing would allow this capability. Bottles can warn the plant of bad driving, rough roads, drops, poor handling. Holistic algorithms could tap into weather, traffic, and the like to inform of operational improvements.

The RFID readers 130 also may be used at the recycler and at the customer. For example, a reader in a vending machine may ensure that the bottle goes to the correct location and consumers may be rewarded for the correct actions. The reader also may be used at the customer's doors for theft prevention, built in to scanners for rapid checkout, built into gondolas for shelf stocking and planogram accuracy, into back doors for shipping and receiving, and the like.

Open codes may be used to immediately reward uses who return the bottles 15 correctly. The codes may be used with reverse vending to ensure the correct bottle has been accepted. Bottles on the recycling belt may be more easily detected than with 2D codes or machine vision. These bottles may be pulled for return to the plant. A trash can also may tell that user to send the bottle elsewhere. Consumers who find bottles as waste may be rewarded differently with tailored incentives and refunds. For example, a consumer who returns a contaminated bottle may receive less money back or targeted advertising about proper use. Bottles may be cross check to prevent recycling fraud where bad bottles are cashed in, stolen, double counted, or other bottle bill scams (so as to save money for the company as well as the local governmental authorities). Bottles may be tracked for returns and recycling so that the data may be reported for various reasons such as regulatory requirements or waste requirements. Bottles found as litter may be fined back to the last known user. This data may be shared with different types of non-governmental organizations conducting, for example, clean ups, river trash inceptors, ocean vessels, and the like. The consumer could be alerted that the bottle was detected on the way to the ocean but successfully intercepted.

Likewise, the customer/vendor may use the RFID tags 120 in any number of ways. For example, theft prevention, shelf stocking, planogram accuracy, block and face warning, low stock warning, just in time stocking and orders, integration with POP displays, integration with fountain refills, quicker check out systems, walk-out stores, write to add promotional or coupons, and the like so as to prevent fraud and price gauging.

In a similar manner, consumers also may use the RFID tags 120. For example, the consumer may send messages to others and to the bottling plant 160. These messages may include contest submissions, quality assurance complaints, requests, photographs of where a bottle was recovered, and the like. The consumer also may write their name to bottle so that when they are at a party or if they are forgetful, they can check to see which bottle is theirs. The consumer also may want to pass on GPS data for the purpose of games, contests, or other activities. Consumers may write secret messages or share "cards", pictures, GPS, text, voice or other data to the next person who reads the code. The bottle also may be pared with amusement rides or movie tickets to unlock additional features, coupons, or experiences.

Figure 8:
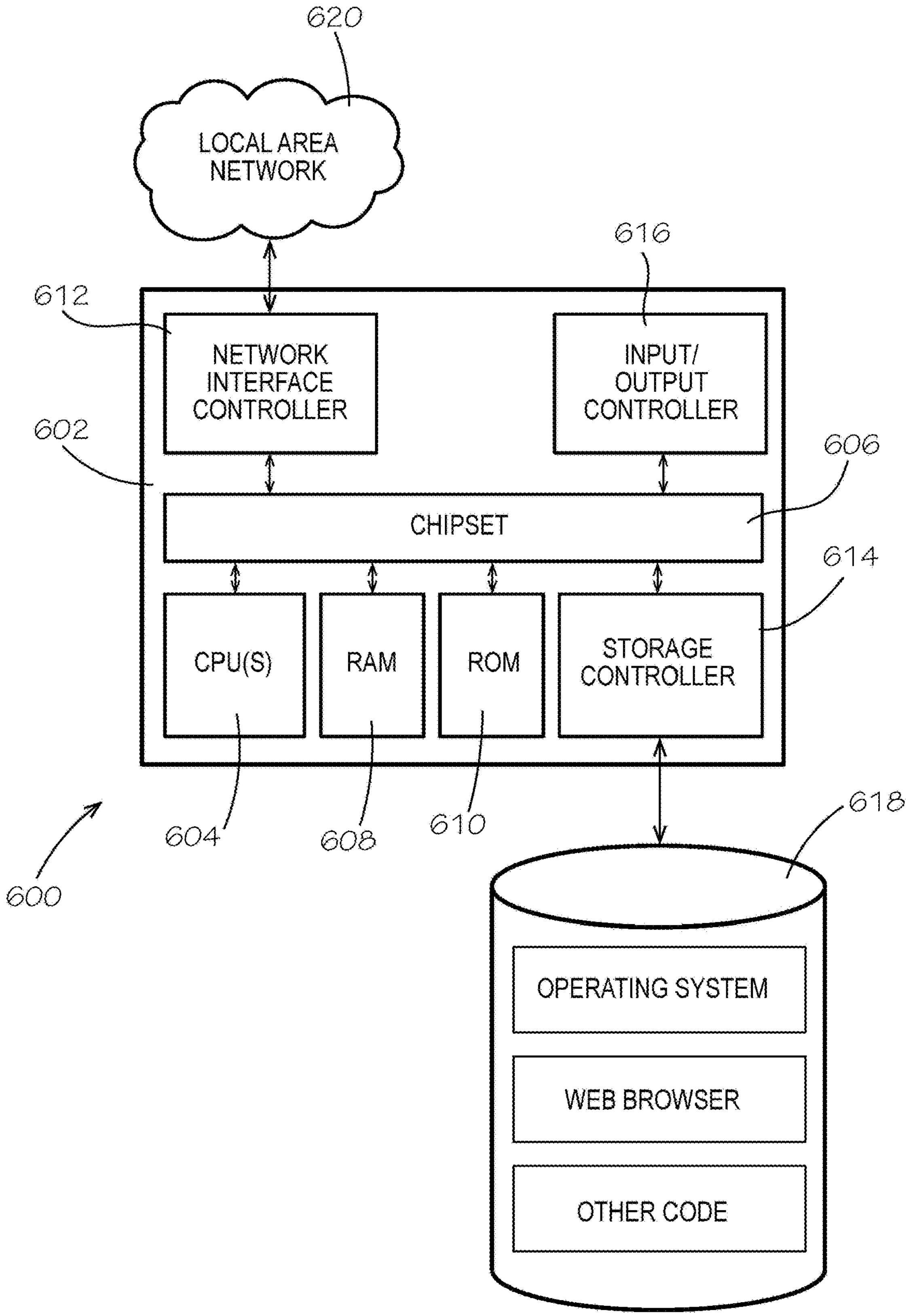
FIG. 8 is a schematic diagram showing exemplary computer architecture for implementing the processes described herein.

FIG. 8 shows an example computer architecture for a computer 600 capable of executing program components for implementing the various elements in the manner described above. The computer architecture shown in FIG. 8 illustrates a conventional server computer, workstation, desktop computer, laptop, tablet, network appliance, e-reader, smartphone, or other computing device, and may be utilized to execute any of the software components presented herein. For example, the computer architecture shown in FIG. 8 may be utilized to execute software components for providing the functions and features described with reference to the figures above and/or related functionality. The computer architecture shown in FIG. 8 might also be utilized to implement the data processing system 150 or any other of the computing systems described herein.

The computer 600 includes a baseboard 602, or "motherboard," which is a printed circuit board to which a multitude of components or devices may be connected by way of a system bus or other electrical communication paths. In one illustrative configuration, one or more central processing units (CPUs) 604 operate in conjunction with a chipset 606. The CPUs 604 may be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a RAM 608, used as the main memory in the computer 600. The chipset 606 may further provide an interface to a computer-readable storage medium such as a read-only memory (ROM) 610 or non-volatile RAM (NVRAM) for storing basic routines that help to startup the computer 600 and to transfer information between the various components and devices. The ROM 610 or NVRAM may also store other software components necessary for the operation of the computer 600 in accordance with the configurations described herein.

The computer 600 may operate in a networked environment using logical connections to remote computing devices and computer systems through a network, such as the local area network 620. The chipset 606 may include functionality for providing network connectivity through a NIC 612, such as a gigabit Ethernet adapter. The NIC 612 is capable of connecting the computer 600 to other computing devices over the network 620. It should be appreciated that multiple NICs 612 may be present in the computer 600, connecting the computer to other types of networks and remote computer systems.

The computer 600 may be connected to a mass storage device 618 that provides non-volatile storage for the computer. The mass storage device 618 may store system programs, application programs, other program modules, and data, which have been described in greater detail herein. The data processing system 150 may be integrated with the mass storage device and/or a separate device. The mass storage device 618 may be connected to the computer 600 through a storage controller 614 connected to the chipset 606. The mass storage device 618 may consist of one or more physical storage units. The storage controller 614 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 600 may store data on the mass storage device 618 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 618 is characterized as primary or secondary storage, and the like.

For example, the computer 600 may store information to the mass storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular discrete component in a solid-state storage unit. Other transformations of physical media are possible without departing from the spirit and scope of the present description, with the foregoing examples provided only to facilitate this description. The computer 600 may further read information from the mass storage device 618 by detecting the physical states or characteristics of one or more particular locations within the physical storage units.

In addition to the mass storage device 618 described above, the computer 600 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 600.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

The mass storage device 618 may store an operating system 530 utilized to control the operation of the computer 600. According to one configuration, the operating system includes at least one of the LINUX operating system, the WINDOWS® SERVER operating system from MICROSOFT Corporation, and the UNIX operating system or one of its variants. It should be appreciated that other operating systems may also be utilized. The mass storage device 618 may store other system or application programs and data utilized by the computer 600, such as one or more applications for carrying out the functions of the server 180, and/or any of the other software components and data described above. The mass storage device 618 might also store other programs and data 652 not specifically identified herein.

In one configuration, the mass storage device 618 or other computer-readable storage media is encoded with computer-executable instructions which, when loaded into the computer 600, transform the computer from a general-purpose computing system into a special-purpose computer capable of implementing the configurations described herein. These computer-executable instructions transform the computer 600 by specifying how the CPUs 604 transition between states, as described above. According to one configuration, the computer 600 has access to computer-readable storage media storing computer-executable instructions which, when executed by the computer 600, perform the various routines described above with regard the figures herein. The computer 600 might also include computer-readable storage media for performing any of the other computer-implemented operations described herein.

The computer 600 may also include one or more input/output controllers 616 for receiving and processing input from a number of input devices, such as a keyboard, a mouse, a touchpad, a touch screen, a capacitive input device, or other type of input device. Similarly, the input/output controller 616 may provide output to a display, such as a computer monitor, a flat-panel display, a digital projector, a printer, a plotter, or other type of output device. It will be appreciated that the computer 600 may not include all of the components shown in FIG. 8, may include other components that are not explicitly shown in FIG. 8, or may utilize an architecture completely different than that shown in FIG. 8.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A bottling facility for filling a glass bottle, comprising:

a filler for filling the glass bottle;

a radio frequency identification tag positioned on the glass bottle;

a radio frequency identification reader; and a data processing system in communication with the radio frequency identification reader;

wherein the radio frequency identification reader identifies the radio frequency identification tag when the glass bottle is filled and the data processing system tracks the number of times the glass bottle is refilled;

wherein the bottling facility further comprises a bottle washer for washing the glass bottle before filing.

2. The bottling facility of claim 1, wherein the radio frequency identification tag is positioned about a neck of the glass bottle.

3. The bottling facility of claim 1, wherein the radio frequency identification tag is positioned about a waist of the glass bottle.

4. The bottling facility of claim 1, wherein the radio frequency identification tag is positioned about a base of the glass bottle.

5. The bottling facility of claim 1, further comprising an inspection system to inspect the glass bottle.

6. The bottling facility of claim 5, wherein the inspection system inspects the glass bottle for damage.

7. The bottling facility of claim 5, wherein the inspection system comprises a visual inspection system.

8. The bottling facility of claim 7, wherein the visual inspection system comprises a visual prewash inspection system and/or a visual postwash inspection system.

9. The bottling facility of claim 5, wherein the inspection system comprises an electronic inspection system.

10. The bottling facility of claim 9, wherein the electronic inspection system comprises an electronic prewash inspection system and/or an electronic postwash inspection system.

11. The bottling facility of claim 1, wherein the radio frequency identification tag is active or passive.

12. The bottling facility of claim 1, wherein the radio frequency identification tag comprises a micro-chip and an antenna.

13. The bottling facility of claim 12, wherein the glass bottle comprises a contoured bottle shape and wherein the antenna comprises a contoured antenna shape.

14. The bottling facility of claim 1, wherein the radio frequency identification reader comprises a near field communications reader.

15. The bottling facility of claim 1, further comprising a plurality of radio frequency identification readers.

* * * * *